United States Patent [19]
Kintz

[11] Patent Number: 5,054,934
[45] Date of Patent: Oct. 8, 1991

[54] SANITARY DISPENSER

[76] Inventor: Clyde L. Kintz, 124 Smart Ct., Encinitas, Calif. 92024-2934

[21] Appl. No.: 386,145

[22] Filed: Jul. 28, 1989

[51] Int. Cl.$^5$ ............................................. B01F 5/26
[52] U.S. Cl. .................................. 366/196; 366/279; 222/189; 222/368
[58] Field of Search .................. 366/64, 99, 154, 155, 366/184, 194, 195, 196, 279, 27, 19, 42; 222/142, 142.1, 142.2, 142.3, 189, 368, 414, 478, 556

[56] References Cited

U.S. PATENT DOCUMENTS

| | | | |
|---|---|---|---|
| 117,540 | 8/1971 | Hinsdells | 366/27 |
| 304,366 | 9/1884 | Sooysmith | 366/19 |
| 516,402 | 3/1894 | P'Pool | 222/142 X |
| 578,952 | 3/1897 | Tellefsen | 222/189 |
| 639,754 | 12/1899 | Morgan | 222/189 |
| 2,970,532 | 2/1961 | Skelton | 366/19 X |
| 4,030,642 | 6/1977 | Morrison | 222/368 |
| 4,157,769 | 6/1979 | Radel | 366/19 X |

FOREIGN PATENT DOCUMENTS 193441  2/1923  United Kingdom ............... 366/19

Primary Examiner—Frankie L. Stinson
Attorney, Agent, or Firm—Henry G. Kohlmann

[57] ABSTRACT

A dispenser for granulated or powdered materials which includes at least one container having an opening at the top thereof, a bottom to such container having a means for removing the contents of said container through said bottom, means for receiving said materials such as a receptacle which can be rotated to dump a predetermined amount of its contents to be mixed within said container, means for mixing said materials within said container, said mixing means further comprising an axle rotatably attached to said container having a plurality of vanes spaced apart from each other, extending radially outward from said axle and disposed such that the plane of each vane is not perpendicular to the axis of the axle, and a sieve in juxtaposition with said sleeve and a cover for said container whereby rotation of said vanes causes a mixing of the materials within the container and urges said mixtures through the sieve.

8 Claims, 1 Drawing Sheet

SANITARY DISPENSER

FIELD OF THE INVENTION

This invention relates generally to bulk dispensers of granulated material including spices and the like for restaurants and other locations where bulk handling of granulated material is required. There are many prior art devices adapted for the dispensing of dry granulated and powdered materials. These prior art devices are typified by that shown in KAANEHE U.S. Pat. No. 3,344,958. In KAANEHE a package of granulated material is inserted in the hopper and withdraw by a spring loaded sliding door with a hole therein for permitting the contents to exit at the bottom of the hopper. While this is adequate for the dispensing of the contents without change, restaurants often require that the contents be mixed. This requires a separate handling of the granulated or powdered substance outside of its container in order to measure and mix the contents thereof thereby risking possible contamination. The instant invention minimizes such contamination risk and permits the ready introduction of various substances for mixing and storage in a single or multiple containers.

SUMMARY OF THE INVENTION

The invention comprises at least one container which may be arranged in juxtaposition with one or more other containers and may have a common wall to at least one such other container, although for the purposes of this invention a single container would comprise the invention. Such container comprises a generally rectangular housing, having a measuring cup and a mixing sieve contained within the housing. An opening in the top of such container permits the introduction of a powdered or granulated substance into the interior of the container, which substance may later be removed from the bottom thereof through a valve. When a substance is so introduced to the container, it first enters the measuring cup. The measuring cup may be rotated to dispense a predetermined measured quantity of material into the mixing blades of the mixing sieve. A different substance may then be introduced into the measuring cup in the appropriate ratio desired and then dispensed into the mixing sieve. The mixing sieve is activated by rotation of the mixing blades as the material gradually flows through the sieves into the bottom of the container. If additional mixing is required the contents may be removed and reintroduced through the top of the container and the mixing operation repeated. Inside the container under conditions which prevent the introduction of foreign material during the mixing process.

DESCRIPTION OF THE PREFERRED EMBODIMENT

Figure 1:
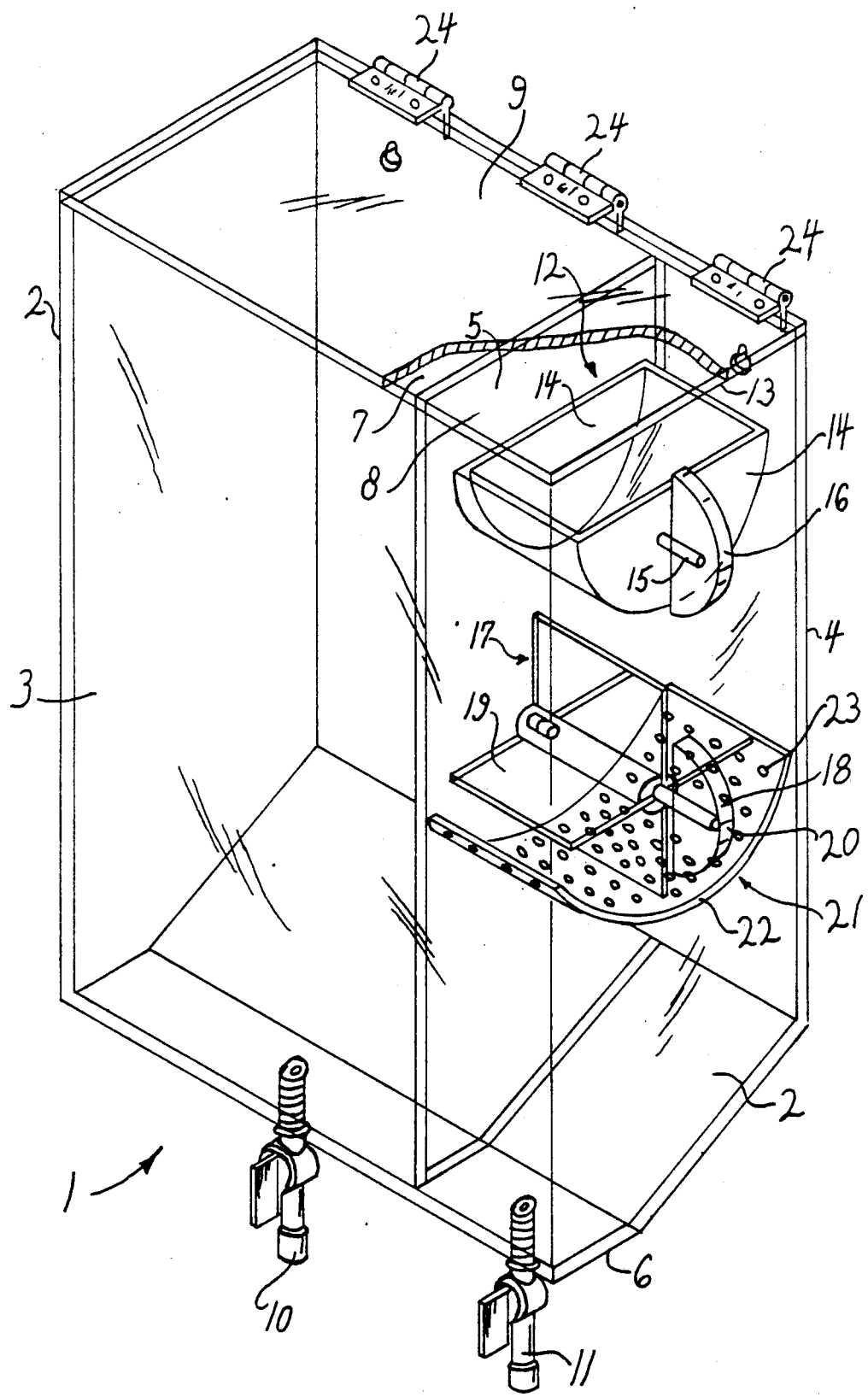
FIG. 1 is a perspective drawing of the container having an additional storage container attached thereto.

Referring now to the drawings, FIG. 1 shows a perspective view of the Sanitary Dispenser 1 and the containers 7 and 8 in juxtaposition to one another within the Dispenser 1. Said Dispenser 1 further comprises end walls 2, front and rear walls 3 and 4 and a internal partition wall 5 separating containers 7 and 8. A bottom 6 is attached to the bottom of the walls 2, 3, 4, and 5 angularly disposed downward towards the rear of the entire structure. The entire structure may be fabricated from a transparent, translucent plastic material. While two containers 7 and 8 are described. It should be noted that a plurality of individual containers could be formed by the addition of a plurality internal partitions and such is considered within the scope of this invention. It should also be noted that a single container 8 is sufficient to fall within the scope of this invention. The containers 7 and 8 are covered by a top 9, attached on one side to dispenser 1 by hinges 24 which permit the top to be opened and closed. It is noted that a separate top could be utilized to cover each of the containers, 7 and 8. Each container is also fitted with a dispensing valve 10 and 11 integral with the bottom 6 at the rear of each container. Each valve communicates with the interior of each of the respective containers and when opened will permit the removal of the contents thereof by gravity action.

One or more of the container 8 could be positioned on the periphery or ends of the plurality of containers provided that access to the mixing action as described below is permitted. The container 8 is fitted with a measuring cup 12. Cup 12 is internally disposed within the container 8 and is rotatably attached to an end wall 2. Measuring cup 12 comprises a concave portion 13 approximating a partial cylindrical section. Section 13 further comprises closed ends 14 which are attached at the ends of section 14 thereby forming a receptacle into which a predetermined amount of material may be introduced. The outside dimensions of the measuring cup 12 are slightly smaller than the inner dimensions of the container 8 and the measuring cup 12 is rotatably attached to the walls of the container by a first axle 15. A handle 16 which communicates with the first axle 15 is provided which permits the measuring cup 12 to be rotated from outside of the container 8 thereby expelling the contents. Positioned immediately below measuring cup 12 is a mixing wheel 17 rotatably attached to said walls by a second axle 18. Said mixing wheel 17 approximates a paddle wheel and has a plurality of paddles or blades 19 disposed along the second axle 18. Mixing wheel 17 also has a handle 20 which communicates with the axle 18 to permit rotation of the mixing wheel 17 from outside of the container. A second cup 21 which comprises a concave section 22 approximating a partial cylindrical section with its axis parallel to the axis of the mixing wheel 17 is fixedly attached to the end walls 2 of the container 8. Said second cup 21 has a plurality of holes 23 in the its cylindrical section of approximately ⅛" in diameter and said cylindrical section is in close proximity to mixing wheel 17. Thus, when salt, for example, is introduced through the top of container 8, an appropriate number of measuring cups 12 of salt may be introduced to the blades 19 of the mixing wheel 17. The appropriate ratio of pepper, for example, may then be added as measured by the number of measuring cups 12 added and also introduced to the blades 19 by rotation of handle 20. The blades 19 may then be rotated and the salt and pepper mixture thoroughly mixed and at the same time, forced through the holes 23 into the bottom of container 8 for storage. In the event the mixture is not sufficiently mixed, the mixture may be withdrawn through valve 11 and the process repeated by simply reintroducing the mixture through the top of the container 8. Thus, the invention provides for a convenient and sanitary way of handling and storing bulk granulated products and a convenient and sanitary way of mixing such products. The second container 7 permits the storage of salt or other substances which are intended to be the major content of the mixture and eliminates the need of handling the bulk containers in adding to the container 8. It is considered within the scope of this invention to also have a third container for pepper or other spices which are to be mixed with the salt or other additional spice.

Having thus described the invention, what is claimed is:

1. A dispenser for granulated or powdered materials comprising:
   a. at least one container having an opening at the top thereof,
   b. a bottom to such container having a means for removing the contents of said container through said bottom,
   c. means for receiving said material to be mixed within said container,
   d. means for mixing said material within said container, said mixing means further comprising an axle rotatably attached to said container having a plurality of vanes spaced apart from each other, extending radially outward from said axle and disposed such that the plate of each vane is not perpendicular to the axis of the axle, and a sieve in juxtaposition with said axle, and
   e. a cover for said container.

2. A dispenser as described in claim 1 wherein said receiving means further comprises:
   a. a receptacle rotatably attached to said container whereby material introduced into said container through the opening thereof is received by said receptacle may be deposited into said mixing means by rotation of said receptacle.

3. A dispenser for granulated or powdered material comprising:
   a. a container having an opening at the top thereof,
   b. a bottom to such container having a means for removing the contents of said container through said bottom,
   c. means for receiving a predetermined amount of said materials to be mixed within said container,
   d. means for mixing said materials with said container, said mixing means further comprising a wheel rotatably attached to said container having a plurality of vanes spaced about the periphery of said wheel and disposed such that the plane of each vane is not perpendicular to the rotational axis of the wheel, and a sieve in juxtaposition with said wheel, and
   e. a top for said container.

4. A dispenser as described in claim 3 wherein said receiving means further comprises:
   a. a receptacle rotatably attached to said container and
   b. a knob attached to said receptacle disposed outside of said container, whereby material introduced into said container through the opening thereof is received by said receptacle may be deposited into said mixing means by rotation of said receptacle.

5. A dispenser for granulated or powdered material comprising:
   a. a plurality of containers having an opening at the top thereof,
   b. a bottom for each container having a means for removing the contents of said container through said bottom,
   c. at least one of said containers having a means for receiving a predetermined amount of said materials within said container,
   d. means for mixing said material within said container, adapted for receiving said predetermined amount of said material, said mixing means further comprising a wheel having an axle rotatably attached to said container having a plurality of vanes spaced about the periphery of said wheel and disposed such that the plane of each vane is not perpendicular to the rotational axis of the wheel, and a sieve in juxtaposition with said wheel, and
   e. a cover for said container.

6. A dispenser as described in claim 5 wherein said receiving means further comprises:
   a. a receptacle rotatably attached to said container and positioned above said wheel adapted for receiving and holding material, whereby material introduced into said container through the opening thereof is received by said receptacle may be deposited into said mixing means by movement of said receptacle.

7. A dispenser as described in claim 6 wherein said receptacle is a cylindrical section having closed ends, the axial direction of said cylindrical section disposed parallel to the axis of said wheel.

8. A dispenser for granulated or powdered materials comprising:
   a. a plurality of containers having an opening at the top thereof,
   b. a bottom for each container having a means for removing the contents of said container through said bottom,
   c. at least one of said containers having a means for receiving a predetermined amount of said material within said container said receiving means further comprising: a receptacle rotatably attached to said container and positioned above said wheel adapted for receiving and holding material and having a first know fixedly attached to the axis of said receptacle accessible from outside of said dispenser,
   d. means for mixing said material within said container, adapted for receiving said predetermined amount of said material, said mixing means further comprising a wheel having an axle rotatably attached to said container having a plurality of vanes thereon and a sieve in juxtaposition with said wheel, and having a second knob fixedly attached to the axis of said wheel accessible from outside of said dispenser and
   e. a cover for said container.

* * * * *